(12) United States Patent
Tellez

(10) Patent No.: US 7,360,820 B2
(45) Date of Patent: Apr. 22, 2008

(54) INFLATABLE APPARATUS FOR COVERING A VEHICLE

(76) Inventor: Robert Tellez, 1307 N. Commerce, Fort Worth, TX (US) 76016

( * ) Notice: Subject to any disclaimer, the term of this patent is extended or adjusted under 35 U.S.C. 154(b) by 0 days.

(21) Appl. No.: 10/138,395

(22) Filed: May 3, 2002

(65) Prior Publication Data

US 2004/0178657 A1 Sep. 16, 2004

(51) Int. Cl.
*B60J 11/04* (2006.01)
(52) U.S. Cl. ............... 296/136.02; 296/136.1; 296/136.13; 150/166
(58) Field of Classification Search ............ 296/136, 296/136.01, 136.02, 136.07, 136.1, 136.12, 296/136.13; 150/166; 114/361
See application file for complete search history.

(56) References Cited

U.S. PATENT DOCUMENTS

| | | | |
|---|---|---|---|
| 2,666,840 A * | 1/1954 | Poirier | |
| 2,688,513 A * | 9/1954 | Poirier | |
| 4,294,483 A * | 10/1981 | Ferris | |
| 5,242,206 A | 9/1993 | Heck | 296/136 |
| 5,275,460 A | 1/1994 | Kraus | 296/136 |
| 5,287,904 A | 2/1994 | Smith et al. | 150/166 |
| 5,401,074 A | 3/1995 | Timerman | 296/136 |
| 5,413,396 A | 5/1995 | Poznansky et al. | 296/136 |
| 5,518,289 A | 5/1996 | Cobble | 296/136 |
| 5,605,369 A * | 2/1997 | Ruiz | |
| 5,650,000 A | 7/1997 | Shuey et al. | 150/166 |
| 5,664,825 A | 9/1997 | Henke et al. | 296/136 |
| D402,622 S | 12/1998 | Rogers | D12/401 |
| 5,845,958 A * | 12/1998 | Rudys et al. | |
| 5,890,525 A * | 4/1999 | Shores | |
| 6,044,881 A * | 4/2000 | Welch et al. | 150/166 |
| 6,056,347 A * | 5/2000 | D'Adamo | |
| 6,070,629 A * | 6/2000 | Whiteside | |

\* cited by examiner

*Primary Examiner*—Jason S Morrow
(74) *Attorney, Agent, or Firm*—James E. Walton

(57) ABSTRACT

According to an embodiment of the present invention, an inflatable apparatus is provided for covering and protecting a vehicle from harmful debris such as hail. The inflatable apparatus includes a plurality of airway chambers that are substantially longitudinal and that cover the top and side portions of the vehicle. The inflatable apparatus may also include a security flap that is sized to fit through an outlet of the vehicle for locking or securing the inflatable apparatus with or to the vehicle. The inflatable apparatus may also include a transparent portion to allow the vehicle to be driven while secured to the vehicle. The inflatable apparatus may also include a panel with a slit opening that is operable for allowing entry into the vehicle while the inflatable apparatus is secured to the vehicle.

1 Claim, 3 Drawing Sheets

INFLATABLE APPARATUS FOR COVERING A VEHICLE

TECHNICAL FIELD OF THE INVENTION

The present invention relates generally to the field of protective vehicle covers, and more particularly, but not by way of limitation, to an inflatable apparatus for covering a vehicle to protect the vehicle from harmful debris, such as hail.

BACKGROUND OF THE INVENTION

Hail damage to automobiles and airplanes can be quite extensive. Hail storms, for example, have been known to cause considerable damage to unprotected vehicles that sustain hail impacts. Protective covers for vehicles are widely available to minimize hail damage. Unfortunately, few of these protective covers are capable of adequately protecting a vehicle from a serious hail storm. Many car covers are designed to protect a vehicle from sun, rain, snow, ice or even a light hail fall. None of these adequately protect from a severe hail storm.

The problems that exist with the present vehicle covers are that they are difficult, cumbersome and time consuming to set up. Also, once the cover is set up on a vehicle, the user cannot access entry into the vehicle. Thus, the vehicle is covered and protected, but the user is exposed to the hail storm and the inside of the vehicle is inaccessible. Other types of covers will protect only the top portion of the vehicle, so the sides of the vehicle are left exposed to the hail. Other inflatable covers do not provide the capability of preventing substantial deflation should part of the cover become punctured. Additionally, the covers that are presently used are bulky, unwieldy, difficult to handle and inconvenient to disconnect from the vehicle and fold and store when not being used.

SUMMARY OF THE INVENTION

The present invention offers an inflatable apparatus that protects vehicles and airplanes from hail and other harmful debris. The inflatable apparatus of the present invention, in one embodiment, is easy to install, deploy and store and allows for entry into the vehicle once it is deployed and installed on the vehicle.

In one aspect, the present invention is directed to an inflatable apparatus for protecting a vehicle from foreign impacting objects. The inflatable apparatus is secured to the vehicle and may include a plurality of airway chambers, each coupled to at least one of an adjacently disposed airway chamber.

In another aspect, the present invention may include an inflatable apparatus comprising a plurality of airway chambers, an inlet, a security flap, a panel with a slit opening, and a plurality of couplings or mechanisms for securing the inflatable apparatus to the vehicle. Each of the airway chambers may be coupled to at least one of the adjacently disposed airway chambers to cover at least a portion of the vehicle. The inlet may communicate with at least one of the plurality of airway chambers that are adapted to receive and communicate an inflation fluid. The security flap may extend adjacent the plurality of airway chambers, wherein the security flap is sized to extend through an opening of the vehicle such as a window or door for locking or securing the inflatable apparatus with the vehicle. The slit opening is operable to allow entry into the vehicle, with at least a first edge of the slit opening being coupled adjacent the plurality of airway chambers to promote hinging access to an opening in the vehicle while the inflatable apparatus substantially covers and protects the vehicle. The inflatable apparatus may be secured to the vehicle using any of a variety of known or available couplings or mechanisms. In one embodiment, the plurality of couplings or mechanisms for securing to the vehicle are further defined as a plurality of eyelets that are adapted to receive a securing cable that will attach to the vehicle for securing the apparatus to the vehicle.

In yet another aspect, the present invention provides an inflatable apparatus comprising a plurality of airway chambers, a security flap, a panel with a slit opening and means for securing the inflatable apparatus to the vehicle. The means for securing the inflatable apparatus is defined as a plurality of magnetic strips adapted to secure the inflatable apparatus to the vehicle.

In another embodiment, the inflatable apparatus further comprises a transparent portion to allow for driving while the apparatus is secured onto the vehicle and wherein the inflatable apparatus is adapted to cover at least a roof portion of the vehicle and at least a hood portion of the vehicle. One advantage of the present invention is the transparent portion allows for driving while the inflatable apparatus is secured on the vehicle. Thus, the inflatable apparatus is operable for use while driving in a hail-storm or other similar storm.

Another advantage, according to one embodiment of the present invention, is the security flap extending adjacent the plurality of airway chambers operates to securely lock the inflatable apparatus onto the vehicle to prevent theft of the inflatable apparatus. As a result, the inflatable apparatus, when the security flap is utilized, will prevent or minimize loss of the apparatus through theft.

An additional advantage of the invention, according to yet another embodiment, is a first airway chamber communicates with at least a second airway chamber via a single-flow valve, which operates to prevent substantial deflation of the inflatable apparatus upon rupture of the first airway chamber. Thus, should one or more airway chambers deflate from, for example, a puncture from hail, the remaining airway chambers will not deflate. Consequently, the rupture of the first airway chamber does not vitiate the effectiveness of the inflatable apparatus.

Another advantage, in one embodiment, is the inflatable apparatus, when attached to the vehicle, covers the sides of the vehicle and operates to protect the sides from foreign impacting debris such as hail. As a result, the sides of the vehicle will not incur any hail damage once the inflatable apparatus is deployed.

In yet another embodiment, another advantage is the panel with a slit opening of the inflatable apparatus operates to allow for entry into the vehicle while the inflatable apparatus substantially covers the vehicle. Thus, the user can safely deploy and set up the inflatable apparatus and subsequently reenter the vehicle to avoid exposure to the weather.

Other objects, features, and advantages of the present invention will be apparent to those skilled in the art from the following detailed description when read in conjunction with the accompanying drawings and appended claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

It should be understood at the outset that although an exemplary implementation of the present invention is illustrated below, the present invention may be implemented using any number of techniques, whether currently known or in existence. The present invention should in no way be limited to the exemplary implementations, drawings, and techniques illustrated below, including the exemplary design and implementation illustrated and described herein.

Figure 1:
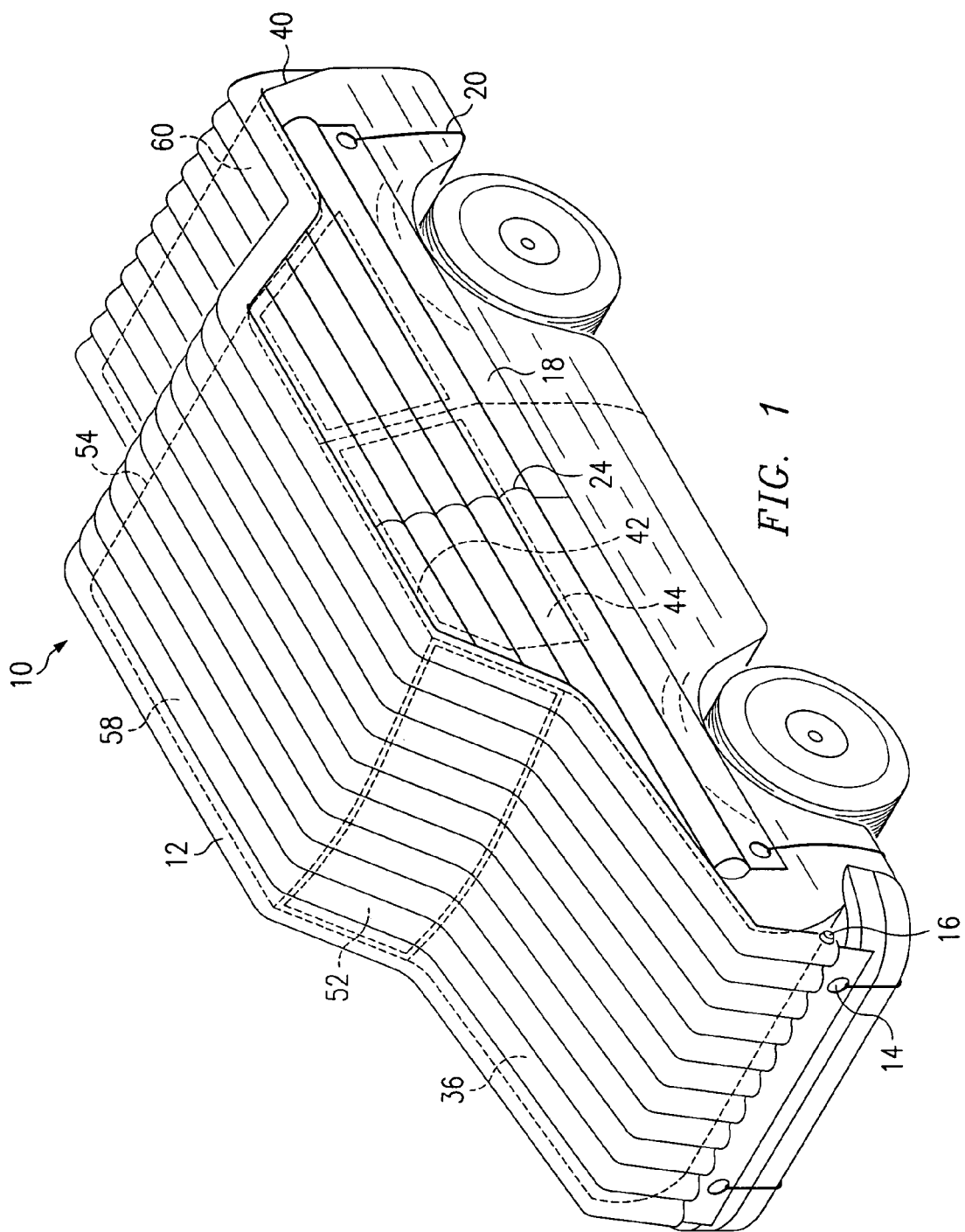
FIG. 1 is a perspective view, according to one embodiment, of an inflatable apparatus of the present invention installed on a vehicle.

FIG. 1 illustrates a perspective view of an inflatable apparatus 10 shown disposed for protecting a vehicle 40 in one embodiment of the present invention. The inflatable apparatus 10 includes a plurality of airway chambers 12 and a plurality of securing areas, such as a plurality of eyelet fasteners 14 or a plurality of magnet strips (not shown) or any other couplings or mechanisms, operable for securing the inflatable apparatus 10 to the vehicle 40.

Figure 2:
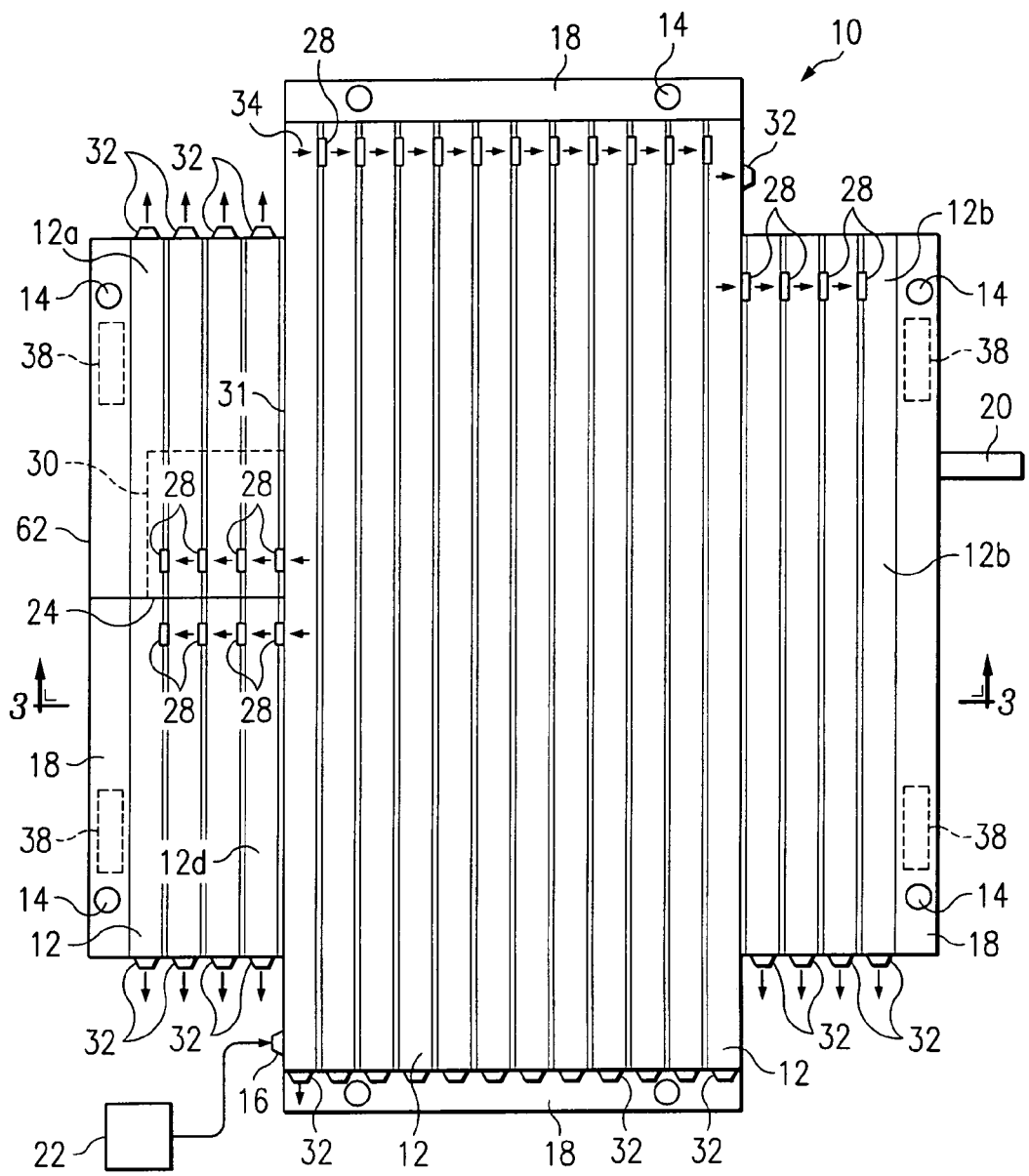
FIG. 2 is a top view of the inflatable apparatus, shown in FIG. 1, in a fully extended and inflated position.

Referring also to FIG. 2, a top view of the inflatable apparatus is shown. The airway chamber 12 may be constructed of a substantially resilient material such as nylon, rayon, polyolefin, polyurethane or similar material sufficient for withstanding hail impacts or other debris impacts. The inflatable apparatus 10 further provides a panel 62 with a slit opening 24 adjacent to the plurality of airway chambers 12 and covering a door 42 of the vehicle 40.

The panel 62, which substantially covers the plurality of doors 42 of the vehicle 40, is a substantially longitudinal member adjacently coupled to the airway chamber 12. The panel 62 with the slit opening 24 allows entry into the vehicle. The panel 62 with the slit opening 24 is operable for allowing opening of the door 42 while the inflatable apparatus 10 substantially covers the vehicle 40.

The plurality of eyelet fasteners 14 for securing the inflatable apparatus 10 may be, but are not limited to, the plurality of eyelet fasteners 14 adapted to receive a securing strap 20 attachable to the vehicle 40. The eyelet fasteners 14 may be a standard o-ring positioned about the periphery of the inflatable apparatus 10 for the passage of a securing strap 20. The eyelet fasteners 14 are adapted to receive, for example, a cable having a hook on either end for attachment to the eyelet fasteners 14 and, for example, the underside of the vehicle 40. It should be appreciated that a number of different methods for accomplishing this attachment may be utilized and include the securing straps 20 (shown in FIG. 1) or a bungee cord or an equivalent strap through the eyelet fasteners 14 for attachment to the vehicle 40 which will readily suggest themselves to one of ordinary skill in the art.

The plurality of airway chambers 12 are substantially similar and may be referred to alphanumerically as 12a, 12b, and so on for purposes of clarity. In one embodiment, the inflatable apparatus 10 is provided with a plurality of flanges 18 adjacently disposed to the outer edge of an airway chamber 12a and an airway chamber 12. The plurality of flanges 18 allows for placement of the eyelet fasteners 14 onto the inflatable apparatus by having the eyelet fastener 14 along the flanges 18. The flanges 18 are designed to securely utilize the eyelet fasteners 14 of the inflatable apparatus 10. The flanges 18 provide a way for reinforcing the eyelet fasteners 14.

In another embodiment the inflatable apparatus 10 may be provided with a plurality of magnetic strips 38 that are used to quickly secure the inflatable apparatus 10 to the vehicle 40. The magnetic strips 38 may be located along or through the flanges 18. The magnetic strips 38 provide an easy, affordable way for securing the inflatable apparatus quickly onto the vehicle 40. The magnetic strips 38 can be used in place of the eyelet fasteners 14 or in conjunction with the eyelet fasteners 14 or any combination thereof.

The inflatable apparatus 10 can be either substantially inflated or substantially deflated and still provide protection from hail or other debris after it is installed onto the vehicle 40 since it is constructed of substantially resilient material. Each of the airway chambers 12 are coupled to at least one of the adjacently disposed airway chambers 12 to comprise the inflatable apparatus 10. Each airway chamber 12 is provided with an inflow valve 28 for inflating the airway chamber 12. A first airway chamber 12c is provided with an inflating valve 16. The inflating valve 16 is operable for receiving fluid into the inflatable apparatus 10.

The fluid for inflating the first airway chamber 12c can be any form of inflating medium such as oxygen, air, carbon monoxide or any other gas or fluid that is conducive for inflating the inflatable apparatus 10. The inflating valve 16 can be a push/pull type opening, a screw type opening, or any other type of opening that will allow for inflating the inflatable apparatus 10. An inflation device 22 may be attached to the inflating valve 16 to force fluid into the plurality of airway chambers 12. The inflating device 22 may be a motorized or hand-held air pump, a connection tube from the inflating valve 16 to the exhaust pipe (not shown) of the vehicle 40, an air cartridge or any other method for inflating the inflatable apparatus 10 that is readily apparent to one skilled in the art. Once each airway chamber 12 is fully inflated, any additional fluid is thereby passed through the inflow valve 28 into the adjacent airway chamber 12, such as a second airway chamber 12d.

The process of inflating each adjacent airway chamber 12 is continued until each airway chamber 12 is fully inflated. Each airway chamber 12 is deployable for self-sustaining the fluid once the airway chamber 12 is substantially filled and each airway chamber 12 is substantially sealed to prevent any fluid leakage. Inflow valve 28 performs a one-way valve function, which will allow fluid to flow in the airway chamber 12 as seen by the arrows 34 and will not allow fluid to flow in the opposite direction of the arrows 34. The inflow valve 28 operates as a check valve or any other method for allowing fluid to enter the airway chambers 12 but not exit.

Once the inflatable apparatus 10 is secured to the vehicle 40 and fully inflated, the inflating valve 16 may be disconnected from the inflating device 22. In one embodiment, each airway chamber 12 is self-sustaining such that each airway chamber 12 will have the inflow valve 28 or the inflating valve 16. Also, each airway chamber 12 may, in other embodiments, be provided with a deflating valve 32. Each airway chamber 12 is designed so that should the adjacent airway chamber 12c be punctured and deflated unintentionally by hail or other debris, the second airway chamber 12d will not deflate as a result. Thus, each of the airway chambers 12 are substantially isolated and sealed to prevent potential deflation should an adjacent airway chamber 12 collapse. However, it should be appreciated that in other embodiments, the plurality of airway chambers 12 are in communication via an opening but not provided with the inflow valves 28.

In other embodiments, the invention may further include a security flap 30 to securely attach the inflatable apparatus 10 onto the vehicle 40 to prevent any theft of the inflatable apparatus 10. Security flap 30 is attached via an edge 31 between airway chamber 12c and airway chamber 12d of the inflatable apparatus 10. The security flap 30 may be sized to fit through a window 44 or the door 42 of the vehicle 40 so that the security flap 30 may be locked with the vehicle 40. Thus, an advantage of the invention is that the inflatable apparatus 10 is operable to securely lock onto the vehicle 40 to minimize possible theft of the inflatable apparatus 10.

In another embodiment, the inflatable apparatus 10 is comprised of substantially transparent material to allow for viewing capability through the inflatable apparatus 10 when positioned on the vehicle 40 so that one could drive while the inflatable apparatus 10 is deployed. The inflatable apparatus 10 is operable for substantially covering the top portion of the vehicle 40, thereby covering at least a front windshield 52, a back window 54, a hood 56, a roof 58, and a trunk 60 portions of the vehicle 40 as shown in FIG. 1. The transparent features of the inflatable apparatus 10 allows for operating the vehicle with full visibility through the front windshield 52 and the back window 54. Thus, an advantage of the present invention is the inflatable apparatus 10 can be used while driving in a storm.

Figure 3:
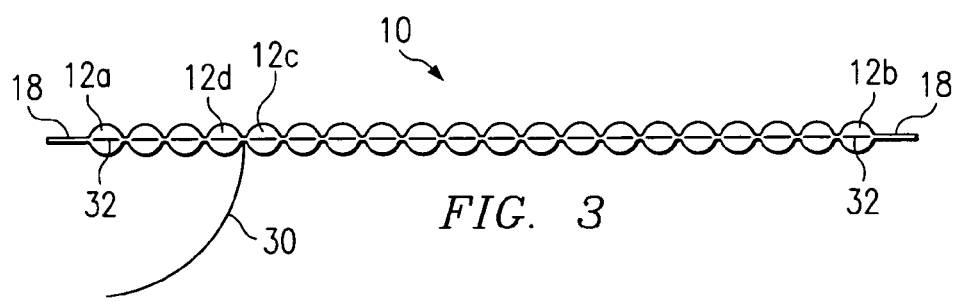
FIG. 3 is a cross-sectional view of the inflatable apparatus shown in FIG. 2 taken along line 3-3.

FIG. 3 is a cross-sectional view of the inflatable apparatus 10 looking from a line 3-3 shown in FIG. 2. In one embodiment, each airway chamber 12 has its own deflating valve 32. As seen in this illustration, the plurality of airway chambers 12 are adjacently coupled to one another. Flanges 18 are attached to the airway chambers 12a and 12b.

In one embodiment, the entire width of the inflatable apparatus 10 is at least as wide as the vehicle's width from one side door 42 to the opposite side door 42 of the vehicle 40. Another advantage of the invention is the inflatable apparatus, when attached to the vehicle 40, covers the sides of the vehicle 40 and operates to protect the sides from foreign impacting debris such as hail.

In one embodiment, the inflatable apparatus 10 can also be used to protect airplanes (not shown) from harmful debris such as hail. The inflatable apparatus 10 would substantially cover the upper portions and sides of the airplane.

In one embodiment (not shown), the plurality of airway chambers 12 of the inflatable apparatus 10 may be provided as interlocking chambers 12 of various configurations. In this manner, each airway chamber 12 may be substantially triangular or rectangular in design. It can be appreciated that any number of different shaped airway chambers 12 can be provided such as cubes, rectangular, cylindrical, circular or any combination thereof and others will readily suggest themselves to one of ordinary skill in the art.

The inflatable apparatus 10 may be detached by simply removing the securing straps 20 from the eyelet fasteners 14 and pulling the magnetic strips 38 away from the vehicle 10 and then removing the entire inflatable apparatus 10 from the vehicle. The process of deflating the inflatable apparatus 10 may be accomplished by switching the deflating valve 32 to the open position as shown in FIG. 4.

Additionally, the security flap 30 is shown as being attached with one edge of the security flap 30 between two airway chambers 12. This view is shown as inflated, however, upon deflation of the inflatable apparatus 10, the airway chambers would be flat and substantially void of fluid.

Figure 4:
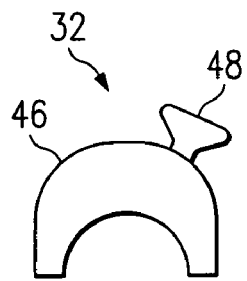
FIG. 4 is a side view of a deflating valve according to one embodiment of the present invention shown in an open position.
Figure 5:
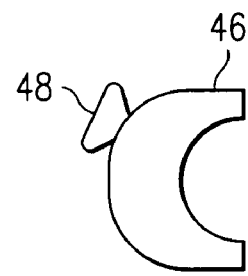
FIG. 5 is a side view of the deflating valve, substantially as shown in FIG. 5, shown in a closed position.

FIG. 4 illustrates the deflating valve 32 in the open position such that fluid would be able to flow through the deflating valve 32 and exit the airway chamber 12. The deflating valve 32 is opened by moving a valve handle 48 such that a valve portion 46 allows fluid to flow out of the airway chamber 12. The deflating valve 32 may be a push/pull type opening, a screw type opening, or any other type of opening that will allow for deflating the inflatable apparatus 10. FIG. 5 illustrates the deflating valve 32 in the closed position such that fluid would not be able to exit the airway chamber 12. The deflating valve 32 is manually opened and closed by switching the valve handle 48 from the upright position open as shown in FIG. 4 to the downright position closed as shown in FIG. 5.

Figure 6:
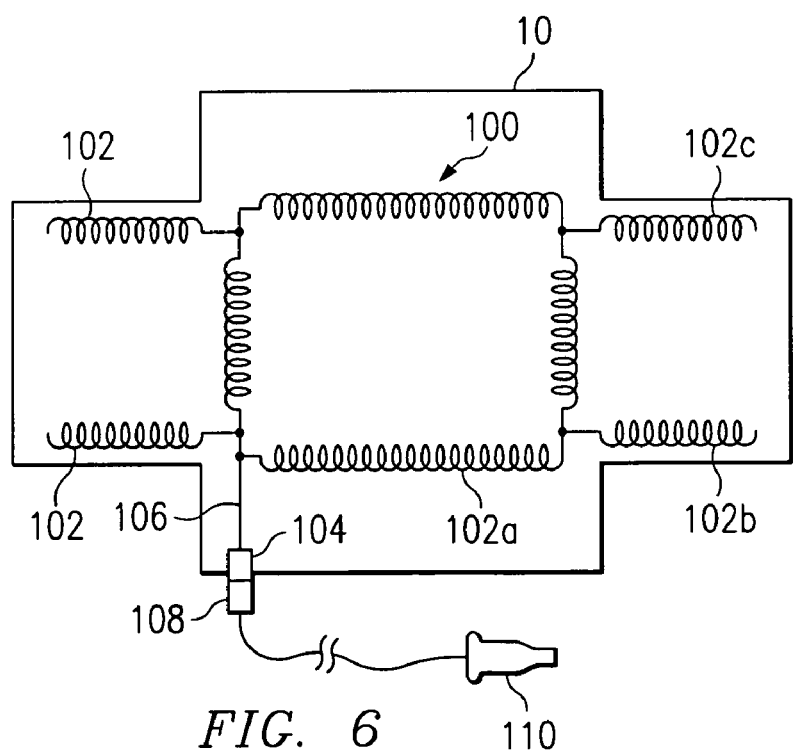
FIG. 6 is a top view of the inflatable apparatus, constructed according to another aspect of the present invention, with a heating system.

FIG. 6 illustrates another aspect of the inflatable apparatus 10 provided with a heating system 100 capable of generating heat to melt ice and snow from the vehicle 40. The heating system 100 is adapted to melt snow that exists on top of the vehicle 40 by placing the inflatable apparatus 10 on top of the vehicle 40 once the snow has collected on the vehicle 40, or is readily adapted to melt snow or ice that has collected on top of the inflatable apparatus 10 when it is in position on the vehicle 40. The heating system 100 is provided with a plurality of heating elements 102 which may be coil type heating elements, but any type of heating elements operable to generate low heat and capable of melting ice and snow over a period of time may be used as well.

The heating elements 102 may be integral to the plurality of airway chambers 12 (not shown) or may be coupled to an outer surface of the plurality of airway chambers 12 using bonding material, such as by bondingly applying a layer of material over the plurality of heating elements 102. The plurality of heating elements 102 may be provided in a number of configurations that will readily suggest themselves to one of ordinary skill in the art and it will be appreciated that the current configuration of the plurality of heating elements 102 is provided for demonstrative purposes only and not intended to limit the placement of the plurality of heating elements 102 of the present invention.

In one aspect, a first heating element 102a may be substantially rectangularly configured about a portion of the inflatable apparatus 10 and electrically coupled to a second and third heating elements 102b and 102c. In this manner, the heating elements 102a, 102b and 102c may be operable for melting snow and ice as on the top and trunk of the vehicle 40, for example. The heating system 100 may further include a connector 104 that is coupled to the inflatable apparatus 10 and in communication with one or more electrical communication lines 106 for providing electricity to the heating elements 102. The connector 104 may be a standard electrical plug adapted to receive an extension cord for connection to an electrical power source.

In other aspects, the connector 104 may be adapted to receive a connector 108 to provide power from other sources, such as by a lighter plug 110 which may be plugged into a standard lighter socket within the vehicle 40. In other aspects, the electrical power supply for the heating system 100 may be provided from a car battery, a solar cell, or other well-known power sources. One advantage of the heating system 100 of the present invention is that, such as in cold temperatures, the inflatable apparatus 10 may provide warmth for an individual.

Also, the techniques, designs, elements, and methods described and illustrated in the preferred embodiment as discrete or separate may be combined or integrated with other techniques, designs, elements, or methods without departing from the scope of the present invention. Other examples of changes, substitutions, and alterations are readily ascertainable by one skilled in the art and could be made without departing from the spirit and scope of the present invention.

What is claimed is:

1. An inflatable apparatus for protecting a vehicle, comprising:
    a plurality of parallel longitudinal airway chambers each arranged so as to extend between a front end of the vehicle and a back end of the vehicle, the plurality of chambers comprising:
        a first group of longitudinal interconnected airway chambers;
        a second group of longitudinal interconnected airway chambers; and
        a third group of longitudinal interconnected airway chambers;
    wherein each of the first group of longitudinal interconnected airway chambers is configured to cover a portion of a hood, a roof, and a trunk of the vehicle;
    wherein the second group of longitudinal interconnected airway chambers is configured to at least partially cover one side of the vehicle; and
    wherein the third group of longitudinal interconnected airway chambers is configured to at least partially cover the other side of the vehicle;
    a plurality of check valves, each check valve being disposed so as to provide one-way fluid communication between a respective neighboring pair of the plurality of chambers which are otherwise fluidly sealed from each other;
    a plurality of deflating valves, each deflating valve being disposed on a respective one of the plurality of chambers for selectively allowing fluid to be removed from the respective one of the plurality of chambers;
    an inflating valve disposed on one of the second group of longitudinal interconnected airway chambers for receiving fluid for inflating all of the plurality of chambers;
    a plurality of flanges, the plurality of flanges comprising:
        first and second flanges extending across opposing ends of the first group of longitudinal interconnected airway chambers;
        a third flange extending along one of the second group of longitudinal interconnected airway chambers; and
        a fourth flange extending along one of the third group of longitudinal interconnected airway chambers;
    a plurality of securing areas, the plurality of securing areas comprising:
        a first group of eyelet fasteners secured to the first flange;
        a second group of eyelet fasteners secured to the second flange;
        a third group of eyelet fasteners secured to the third flange; and
        a fourth group of eyelet fasteners secured to the fourth flange;
    a plurality of securing straps, the plurality of securing straps comprising:
        a first group of securing straps for securing the plurality of chambers to the vehicle by connecting the first group of eyelet fasteners to the second group of eyelet fasteners, each of the first group of securing straps connecting a respective pair of eyelet fasteners; and
        a second group of securing straps for securing the plurality of chambers to the vehicle by connecting the third group of eyelet fasteners to the fourth group of eyelet fasteners, each of the second group of securing straps connecting a respective pair of eyelet fasteners.

* * * * *